United States Patent [19]
Virtanen

[11] Patent Number: 5,963,548
[45] Date of Patent: Oct. 5, 1999

[54] APPARATUS AND METHOD FOR CONFIGURING A DATA CHANNEL FOR SYMMETRIC/ASYMMETRIC DATA TRANSMISSION

[75] Inventor: Sami Virtanen, Espoo, Finland

[73] Assignee: Nokia Mobile Phones Limited, Salo, Finland

[21] Appl. No.: 08/787,498

[22] Filed: Jan. 21, 1997

[51] Int. Cl.⁶ ..................................................... H04J 13/00
[52] U.S. Cl. ........................................... 370/335; 370/468
[58] Field of Search ..................................... 370/252, 253, 370/465, 468, 474, 335, 342, 277–281, 294; 455/67.1, 67.3, 422

[56] References Cited

U.S. PATENT DOCUMENTS

| | | | |
|---|---|---|---|
| 4,692,761 | 9/1987 | Robinton | 340/825.01 |
| 5,406,557 | 4/1995 | Baudoin | 370/407 |
| 5,485,520 | 1/1996 | Chaum et al. | 380/24 |
| 5,638,399 | 6/1997 | Schuchman et al. | 370/324 |

FOREIGN PATENT DOCUMENTS

| | | |
|---|---|---|
| 0681406A1 | 11/1995 | European Pat. Off. . |
| WO95/35002 | 12/1995 | WIPO . |
| WO96/2239 | 7/1996 | WIPO . |
| WO96/27960 | 9/1996 | WIPO . |

*Primary Examiner*—Jason Chan
*Assistant Examiner*—Jasper Kwoh
*Attorney, Agent, or Firm*—Perman & Green, LLP

[57] ABSTRACT

A system for configuring signaling messages in a telecommunications system when setting up the data transmission rates on the forward and reverse links for data transmission on a variable rate symmetric/asymmetric data channel, so as to shorten the time and signal length required in the connection setup of such a system and to reduce the demand on processing resources and processing time in both the mobile and the base stations. An information record contained in a signaling message, such as a Service Request Message, a Service Response Message, a Service Connect, or a Status Response Message, that is used to to setup the forward and reverse links of the data channel, is provided with an ASYMMETRIC_RATES bit field. In the case when both forward and reverse links are indicated in a service type message to use the same rate configuration, i.e., the same link setup parameters, the ASYMMETRIC_RATES bit, i.e., the bit in the ASYMMETRIC_RATES field in the signaling message, is set to one binary value, e.g., '0', to indicate that the same rate configuration is used for both directions. Then only one rate configuration is encoded in the service type message and the message is considerably shortened saving time and reducing complexity. The ASYMMETRIC_RATES bit field may be used to advantage in other message applications.

20 Claims, 8 Drawing Sheets

| SERVICE TYPE DATA | ASYMMETRIC RATES | FORWARD LINK RATE DATA | ADDITIONAL CONTROL DATA |
|---|---|---|---|

| SERVICE TYPE DATA | ASYMMETRIC RATES | FORWARD LINK RATE DATA | REVERSE LINK RATE DATA | ADDITIONAL CONTROL DATA |

FIG. 5A

| SERVICE TYPE DATA | ASYMMETRIC RATES | FORWARD LINK RATE DATA | ADDITIONAL CONTROL DATA |

FIG. 5B

APPARATUS AND METHOD FOR CONFIGURING A DATA CHANNEL FOR SYMMETRIC/ASYMMETRIC DATA TRANSMISSION

RELATED APPLICATIONS

The present application involves technology that relates to that disclosed in commonly-assigned co-pending applications under U.S. Ser. No. 60/025,183 and U.S. Ser. No. 08/712,309, of Z-C. HONKASALO ET AL, and U.S. Ser. No. 08/711,535, of J. NONEMAN, the subject matter of which is incorporated herein by reference.

BACKGROUND OF THE INVENTION

1. Field of the Invention

This invention relates to telecommunications systems and, more particularly, to an apparatus and method for providing reduced length link setup signaling messages in a telecommunications system having a variable rate symmetric/asymmetric data channel.

2. Prior Art

Advances in the field of telecommunications have resulted in a variety of types of telecommunications systems being available for use by the general public. Among these telecommunications systems, cellular telephone networks are presently one of the most rapidly developing in terms of technologies and services offered. Cellular networks are currently in widespread use worldwide, with continued growth in sales and subscribers predicted for the foreseeable future.

Several types of technologies have become dominant in the cellular industry. In the United States most cellular systems currently operating use analog signal transmission techniques, as specified by the Telecommunications Industry Association/Electronic Industry Association(TIA/EIA) AMPS standard, or a combination of analog and time division multiple access (TDMA) signal transmission techniques, as specified by the TIA/EIA IS-54 and IS-136 standards. In Europe, cellular systems may operate according to one of several analog system standards, depending on the country, or according to the digital Global Services for Mobile (GSM) TDMA standard that has been specified for Europe. In other parts of the world most cellular systems operate according to one of the standards used in the United States or Europe, except for in Japan where the TDMA personal digital communication (PDC) standard has been developed and is in use. However, despite the present dominance of analog and TDMA technologies, the cellular industry is dynamic and new technologies are constantly being developed as alternatives to these currently dominant technologies. One alternative digital signal transmission technique that has recently been the focus of attention for cellular systems is known as code division multiple access (CDMA). In a CDMA system, multiple users, each using a channel identified by a uniquely assigned digital code, communicate with the system while sharing the same wideband frequency spectrum. CDMA provides several advantages over conventional analog or TDMA systems. For example, a CDMA system does not require frequency spectrum allocation planning for the mobile stations (MS) and the base stations (BS) of the cells, as with analog and TDMA systems, because all CDMA base stations share the entire downlink frequency spectrum, and all mobiles share the entire uplink frequency spectrum. The fact that the wideband frequency spectrum is shared by all uplink or downlink users in CDMA also increases capacity since the number of users that can be multiplexed simultaneously is limited not by the number of radio frequency channels available, but rather by the number of digital codes available to identify the unique communications channels of the system. Additionally, since the energy of the transmitted signals are spread over the wide band uplink or downlink frequency band, selective frequency fading does not affect the whole CDMA signal. Path diversity is also provided in a CDMA system. If multiple propagation paths exist, they can be separated as long as the differences in path delays does not exceed 1/BW, where BW equals the bandwidth of the transmission link. An example of a widely accepted cellular system CDMA standard is the TIA/EIA IS-95-A system specification.

Because data transmission applications other than conventional voice traffic transmission are becoming increasingly important in the wireless or cellular system area, a cellular system operator may desire to provide other services along with, or instead of, phone voice service on the system. Examples of these other services include portable computer cellular modem service or video service or the like which may also involve packet data. Often, these other services may require that data be transmitted at a rate much faster than that required for voice transmission. Hence, in the event that it is desired to provide a range of different services in a cellular system, it is useful to vary the data transmission rate in the system so that the data rate can be varied within a range required for all system services to provide both slower speed data transmission for efficient and reliable speech service and high speed data transmission for packet data and other applications. For example, the IS-95-A specified CDMA system is limited to a maximum data rate of 9600 bits per second (9.6 kbps) and it may be desirable to provide services in the IS-95-A system that require data transmission at rates greater than 9.6 kbps. It would also be desirable to provide services that allow the use of different data rates on each of the forward (base to mobile) and reverse (mobile to base) links. These same services would also be useful in other types of systems such as, for example, TDMA systems.

Problem to be Solved:

In high speed data and packet data applications there is a need to exchange much information about rate configuration during setup of the connection. This setup can require large signaling messages involving the rate configurations for the forward and reverse links. For example, the current IS-95 specification calls for the rate configuration for forward and reverse links to be encoded separately requiring a number of separate fields in the signaling messages. Consequently, connection setup poses a problem with regard to time and signal length. Also, a larger number of separate fields in the setup signaling messages requires more processing in both the mobile station and the base station.

Objects:

It is thus an object of the present invention to provide an improved high speed data rate service in a wireless or cellular phone system, such as a CDMA system.

It is another object of the invention to provide an apparatus and method for shortening the time and signal length required in the connection setup of such a system.

It is a further object of the invention to reduce the number of separate fields required in signal messages used in the connection setup of such a system, and to reduce the demand on processing resources and the processing time required in both the mobile station and the base station.

It is also an object of the invention to provide reduced length link setup signaling messages in a system having a variable rate symmetric/asymmetric data channel when the forward and reverse links of the data channel use the same data rate configuration.

SUMMARY OF THE INVENTION

The present invention is directed to providing an apparatus and method for configuring signaling messages in a telecommunications system when setting up the data transmission rates on the forward and reverse links for variable data transmission, so as to shorten the time and signal length required in the connection setup of such a system and to reduce the demand on processing resources and processing time in both the mobile and the base stations. In a preferred embodiment the invention includes a message format that avoids encoding the rate configurations for forward and reverse links separately, in assigned fields in the signaling messages, when the contents of the rate configurations for both links are the same. It takes advantage of the fact that when both forward and reverse links use the same rate configuration, i.e., the same setup parameters, it is not necessary to convey duplicate rate information if some other manner of indicating this situation is available. In accordance with the invention, an ASYMMETRIC_RATES bit field is included in a link setup request message, and when both forward and reverse links use the same rate configuration, the ASYMMETRIC_RATES bit is set to one binary value, e.g., '0', to indicate that the same rate configuration is requested for both directions. Then only one rate configuration is encoded in the message. This encoding considerably shortens the message thus saving time and reducing complexity. For the case when the forward and reverse links use different rate configurations, the ASYMMETRIC-RATES bit in the signaling message is set to the other binary value, i.e., '1', indicating that two different rate configurations are to be encoded in the signaling message and both configurations must be included, making the message length conventional. Nevertheless, the net effect of the invention is to improve the connection setup in a variable rate data transmission telecommunications system, and the ASYMMETRIC_RATES bit may be used to advantage in other message applications.

BRIEF DESCRIPTION OF THE DRAWINGS

A more complete understanding of the apparatus and method of the present invention may be had by referring to the following detailed description read in conjunction with the accompanying drawings wherein:

FIGS. 5A and 5B are diagrams showing the data frame structure used for transmissions in an embodiment of the invention.

DETAILED DESCRIPTION OF THE PREFERRED EMBODIMENTS

The present invention embodies an apparatus and method for shortening the time and signal length required in the connection setup in a telecommunications system by configuring the signaling messages, when setting up the data transmission rates on the forward and reverse links for variable data transmission, such that if both forward and reverse links use the same rate configuration, i.e., the same setup parameters, only one rate configuration is encoded in the signaling message. Briefly, this improvement is achieved with the use of an ASYMMETRIC_RATES bit field in the link setup request message. However, for a thorough understanding of the context and features of the apparatus and method for carrying out the invention the following description is presented.

Figure 1:
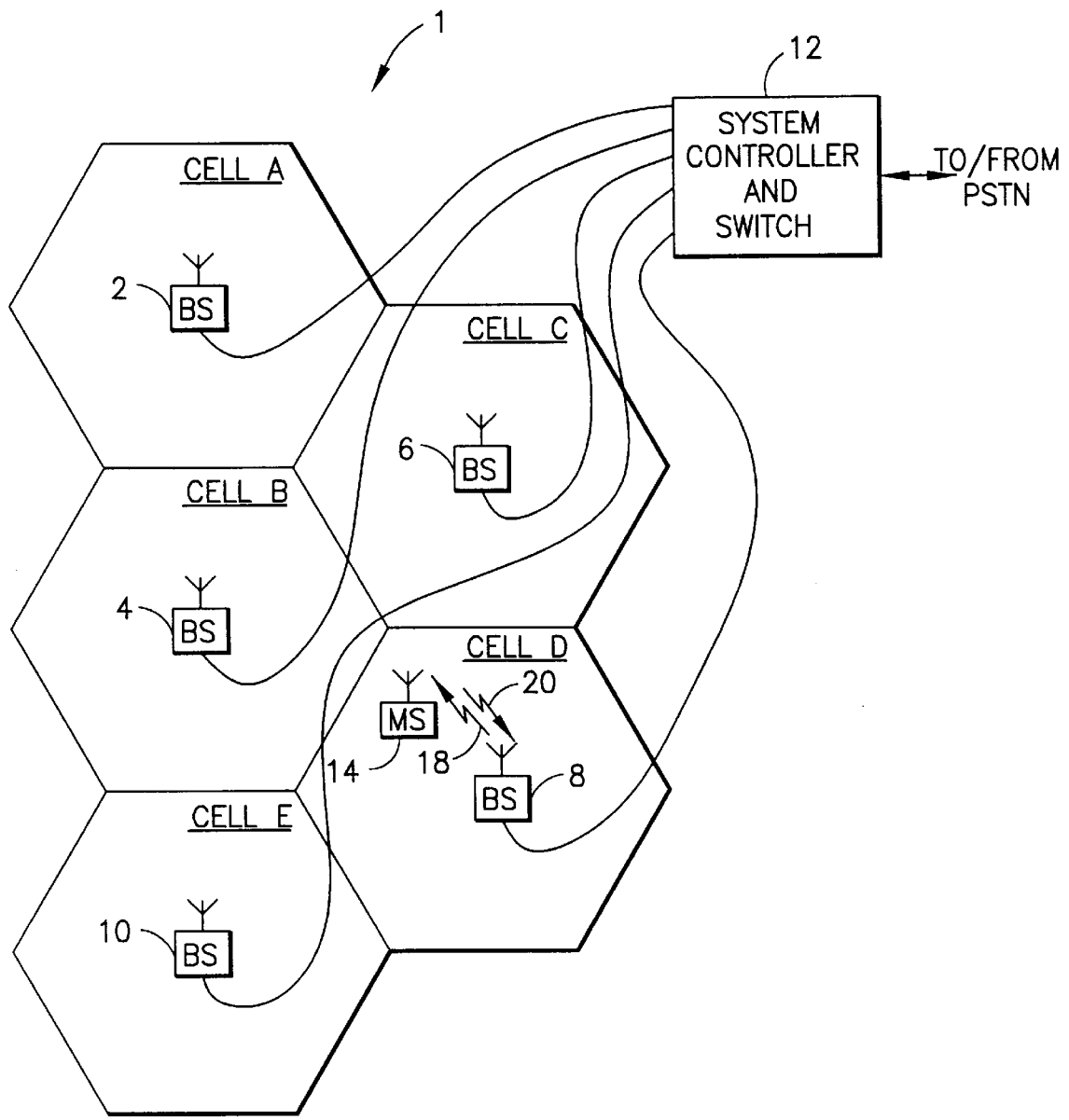
FIG. 1 is a block diagram illustrating a telecommunications system which may be adapted to incorporate an embodiment in accordance with the present invention.

FIG. 1 illustrates a set of operating components in a telecommunications system 1 constructed in a manner suitable for the incorporation of an embodiment of the present invention. Telecommunications system 1 may be any telephone or wireless system for transmitting messages between two stations that can be adapted to exchange messages in accordance with the invention. The preferred embodiment is implemented in, and will be described in connection with, a celular phone system having base stations and mobile stations. The mobile stations may be in the form of cellular telephones, computers, and other such transceivers, which are used by a person or subscriber to communicate with one or more base stations operated by a service provider. As all forms of mobile stations may not be readily movable or portable, although for the most part they are, herein the mobile stations may also be referred to as personal stations. Accordingly, system 1 is shown as cellular and includes a mobile station 14 that communicates with an infrastructure that comprises a series of base stations 2, 4, 6, 8, and 10, disposed respectively in cells A–E and all connected to a system controller and switch 12. A subscriber to the cellular telephone service of system 1 may use mobile station 14 to make and receive phone calls over a radio interface, having forward and reverse links, 20 and 18, between station 14 and base station 8, as station 14 moves throughout the coverage area of the system. The base stations are connected to controller and switch 12 over conventional cellular phone connections, and controller and switch 12 is connected to a public switched telephone network (PSTN) to enable subscribers to make and receive calls from the landline public network. The cells A–E are shown as about the same size and may be the size of a "micro cell", i.e., about 500 meters in width. Such cells may require a maximum mobile station transmission power level of 200 mw. In this embodiment, system 1 provides variable rate transmission over the data links, with the forward and the reverse links, 20, 18, being either symmetric (same data rates) or asymmetric (different data rates).

Figure 2A:
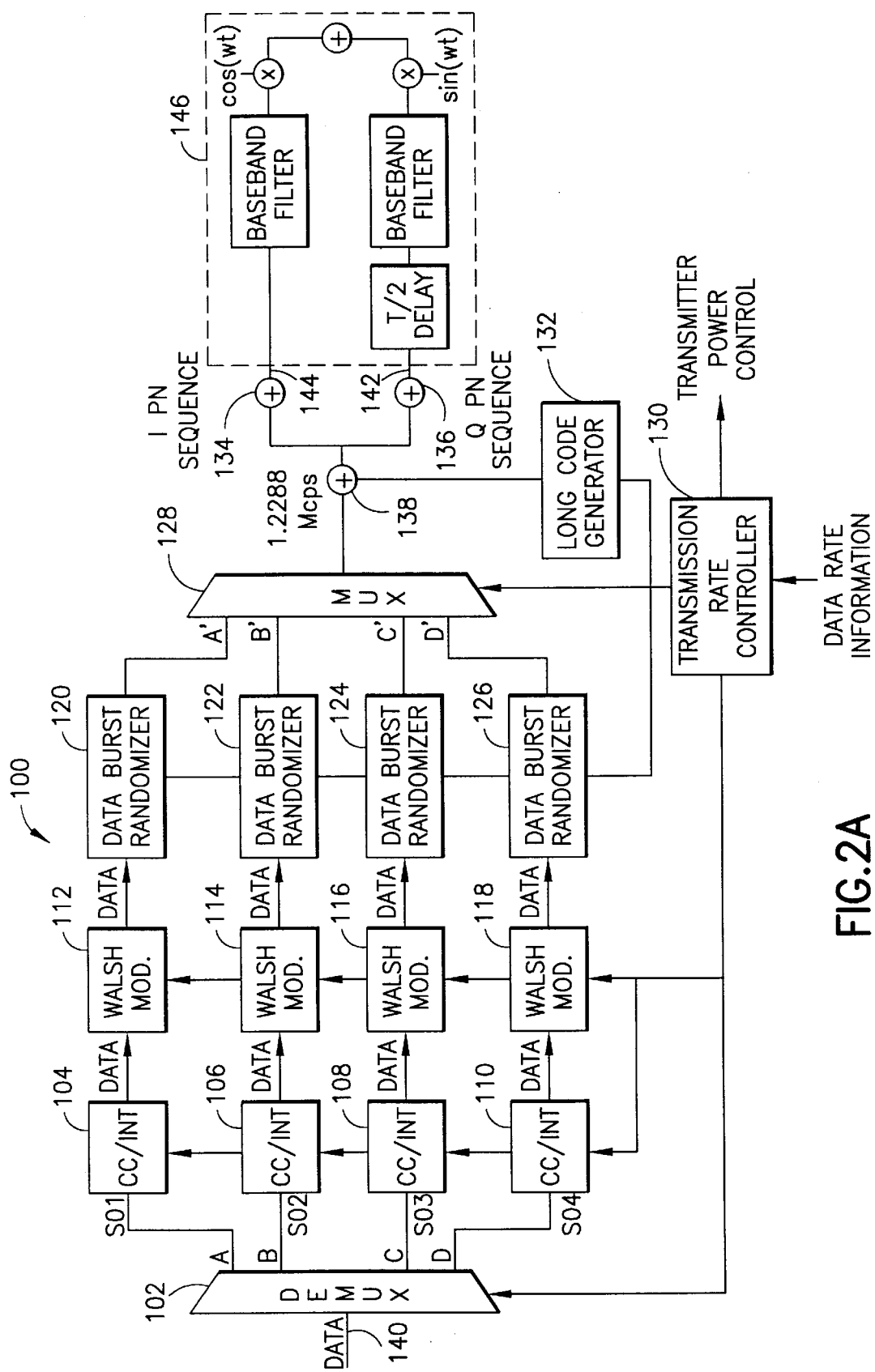
FIG. 2A is a schematic block diagram showing portions of a transmitter/modulator for transmitting variable rate data on a reverse link in the system of FIG. 1 according to an embodiment of the present invention.

Referring now to FIG. 2A, the schematic block diagram therein shows portions of a transmitter modulator 100 for transmitting variable rate data on a reverse link of a cellular system according to an embodiment of the invention. Transmitter modulator 100, which may be utilized in the reverse link 18 of mobile station 14 of FIG. 1, includes an input circuit referred to for convenience as demultiplexer (DEMUX) 102, along with parallel convolutional coder/interleavers (CC/INT) 104, 106, 108, and 110, parallel Walsh modulators (Walsh mod.) 112, 114, 116, and 118, data burst randomizers 120, 122, 124, and 126, multiplexer (MUX) 128, transmission rate controller 130, long code generator 132, long code spreader 138, Q PN spreader 136, and I PN spreader 134.

In operation, transmitter modulator 100 receives input data on input line 140 and generates output data, from spreaders 134 and 136, on output lines 144 and 142 to RF circuitry 146 for transmission. The digital data on line 140 is input to DEMUX 102 and modulated into 20 ms transmission frames that may be formatted into frames of serial data consisting of a data field, a frame rate bits field, a CRC field, and a tail bit field, and may have various possible configurations, such as a full rate data frame (192 bits), a half rate data frame (96 bits), a quarter rate data frame (48 bits), and an eighth rate data frame (24 bits). The frame rate bits indicate the change in frame rate of the next following data frame in a data transmission, relative to the data frame in which the frame rate bits are located.

In the embodiment shown, transmitter modulator 100 utilizes four parallel subchannels or "pipes" SC1–SC4. Each of these subchannels is capable of carrying data between DEMUX 102 and MUX 128, for data transmission rate variation, and each is allocated a quarter period (0.3125 ms) of each of sixteen 1.25 ms power control group transmission periods of each transmitted 20 ms frame. Depending on the data transmission rate requirements, each of the four subchannels may or may not carry data transmissions in the 0.3125 ms period allocated to it in a particular 20 ms frame. The first subchannel SC1 is formed by the data transmission path from output A of DEMUX 102 through CC/INT 104, Walsh mod. 112, and data burst randomizer 120 to input A' of MUX 128; the second subchannel SC2 is formed by the data transmission path from output B of DEMUX 102 through CC/INT 106, Walsh mod. 114, and data burst randomizer 122 to input B' of MUX 128; the third subchannel SC3 is formed by the data transmission path from output C of DEMUX 102 through CC/INT 108, Walsh mod. 116, and data burst randomizer 124 to input C' of MUX 128; and the fourth subchannel SC4 is formed by the data transmission path from output D of DEMUX 102 through CC/INT 110, Walsh mod. 118, and data burst randomizer 126 to input D' of MUX 128. Although four parallel subchannels are shown, alternatives of this embodiment having more or less than four subchannels are possible.

Figure 2B:
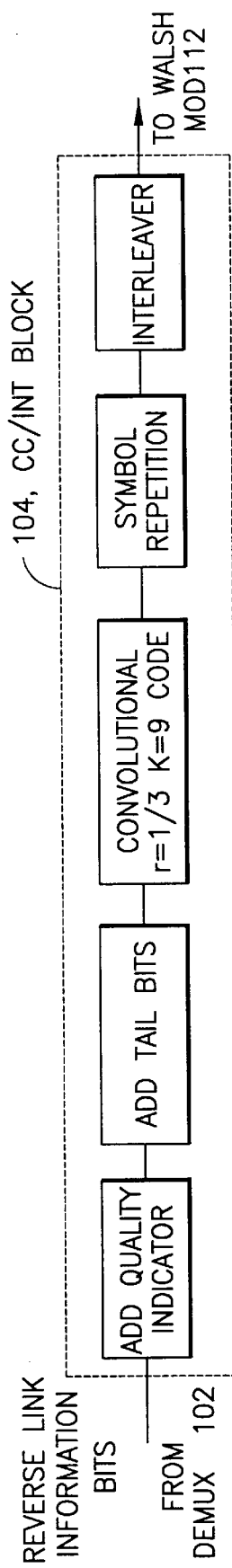
FIG. 2B is a block diagram illustrating in greater detail the functions of a CC/INT block of FIG. 2A.

FIG. 2B illustrates an example of the functions of a suitable, but not limiting, CC/INT block, e.g., block 104 of FIG. 2A, for use with data conforming to the IS-95 specification. A data frame input from demultiplexer (DEMUX) 102 and containing reverse link information bits, has a quality indicator added thereto, followed by the addition of tail bits. The data frame bits are then convoluted, checked for symbol repetition, and interleaved before being input to Walsh modulator 112.

Transmitter modulator 100 can be designed to be compatible with the transmission parameters of the data rates specified for the CDMA uplink of IS-95 as set forth in the document TIA/EIA/IS-95-A. In the configuration of transmitter modulator 100 that is designed for compatibility with IS-95-A, transmitter modulator 100 may be used to provide data for transmission at the IS-95-A rates of 9.6 kbps for full rate, 4.8 kbps for half rate, 2.4 kbps for one-quarter rate, and 1.2 kbps for one-eighth rate using 20 ms frames. The data transmission rate can also be increased to 19.2 kbps, 28.8 kbps, or to 38.4 kbps by decreasing the duration of the data frames. Also by operating subchannels in varying increments of full rate with shorter data frames, data transmission rates between 9.6 kbps, 19.2 kbps, 28.8 kbsp and 38.4 kbps can obtained. Transmission rate controller 130 may generate control signals to DEMUX 102 to select the subchannels according to a predetermined algorithm, so that full rate frames are formed whenever possible. In response, the DEMUX 102 routes or directs the incoming bit stream to various ones of the CC/INT blocks 104, 106, 108, and 110.

In the embodiment of FIGS. 2A and 2B, the actual length of each data frame in time depends on the number of subchannels (SC) being used at 9.6 kbps. For example, with 9.6 kbps input serial data where one subchannel is used at 9.6 kbps, each frame is 20 ms in length and full rate. With 14.6 kbps data transmission, where one subchannel is being used at 9.6 kbps and one subchannel is being used at 4.8 kbps, each data frame is 10 ms long, with pairs of data frames having one frame being full rate and the next adjacent frame being half rate. For 19.2 kbps data transmission using two subchannels at 9.6 kbps, each data frame is 10 ms long with each frame being full rate. Each consecutive data frame received at input 140 is demultiplexed into a subchannel at DEMUX 102. The demultiplexing is done according to the input serial data rate. The serial data frames are transparent to the next level of processing beginning at DEMUX 102, and will be reassembled in the receiver having the same information content and data frame format as at input 140.

Transmission rate controller 130 receives data rate information from a central control processor prior to the beginning of each 20 ms period, within which the data to be transmitted in a 20 ms transmission frame is received, and generates the appropriate control signals to DEMUX 102 and MUX 128. Depending on the rate of the data received on input 140, DEMUX 102 multiplexes each data frame received so that data is received on at least one of the inputs of CC/INT 104, CC/INT 106, CC/INT 108, and CC/INT 110 at a rate of 9.6 kbps or less, i.e., at a half (4.8kbps), quarter (2.4 kbps), or eighth (1.2 kbps) rate. If data is received on input 140 at 9.6 kbps, DEMUX 102 switches data to only the first subchannel SC1. If data is received on input 140 at 19.2 kbps, the data is multiplexed between the first and second subchannels, SC1 and SC2. If data is received at 28.8 kbps, the data is multiplexed among the first, second, and third subchannels, SC1–SC3. And, if data is received at 38.4 kbps, the received data is multiplexed among all four subchannels, SC1–SC4. MUX 128 then multiplexes the data from each subchannel onto the appropriate 0.3125 ms period of each power control group in each 20 ms frame and inputs the data to spreader 138. The output data from spreader 138 is passed through spreaders 134 and 136 and on output lines 144 and 142 to RF circuitry 146 for transmission as variable rate data on reverse link 18 of cellular system 1.

Figure 3A:
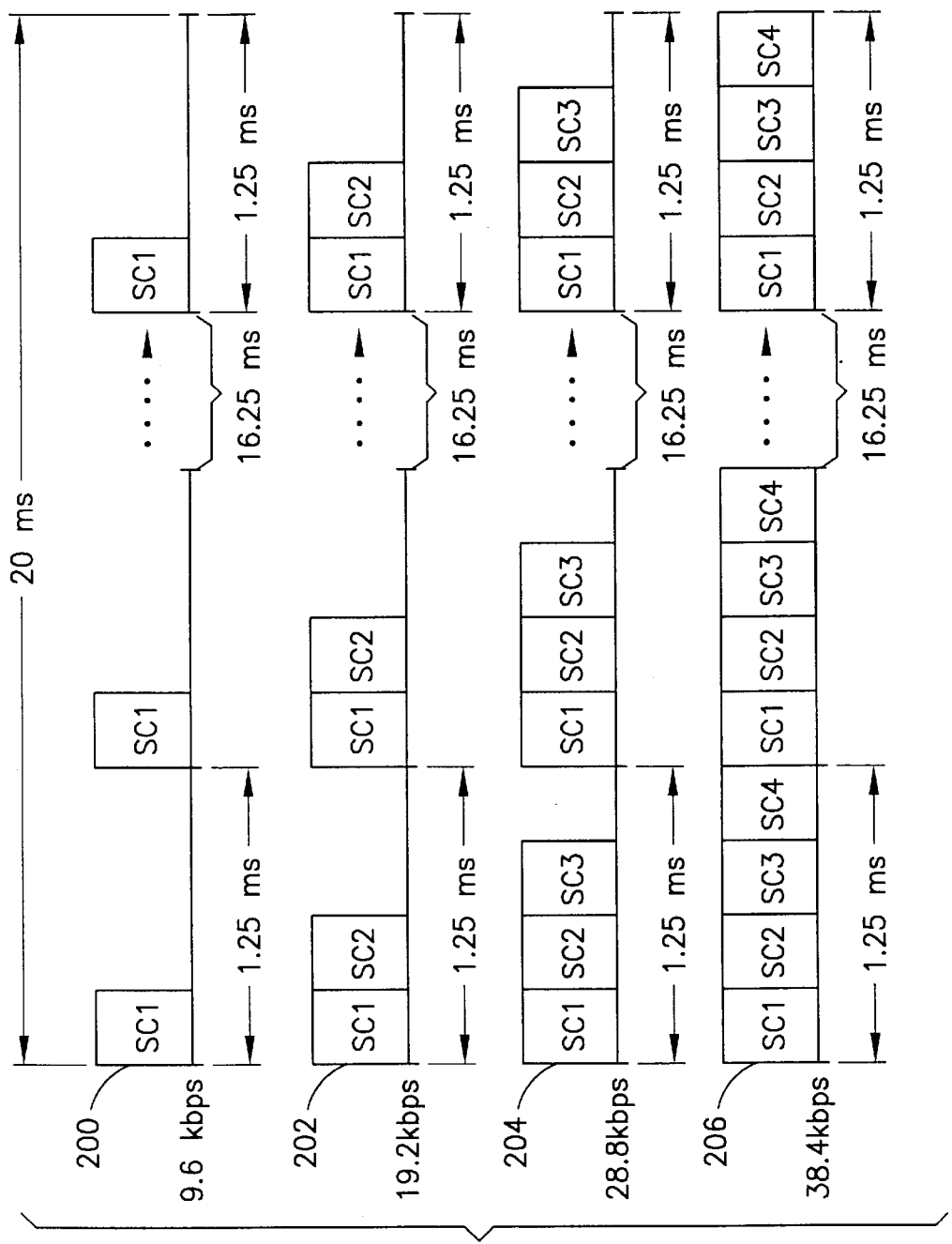
FIGS. 3A and 3B are timing diagrams illustrating transmitter/modulator operation and receiver/demodulator operation according to the embodiments of the invention shown in FIGS. 2A–2C.
Figure 3B:
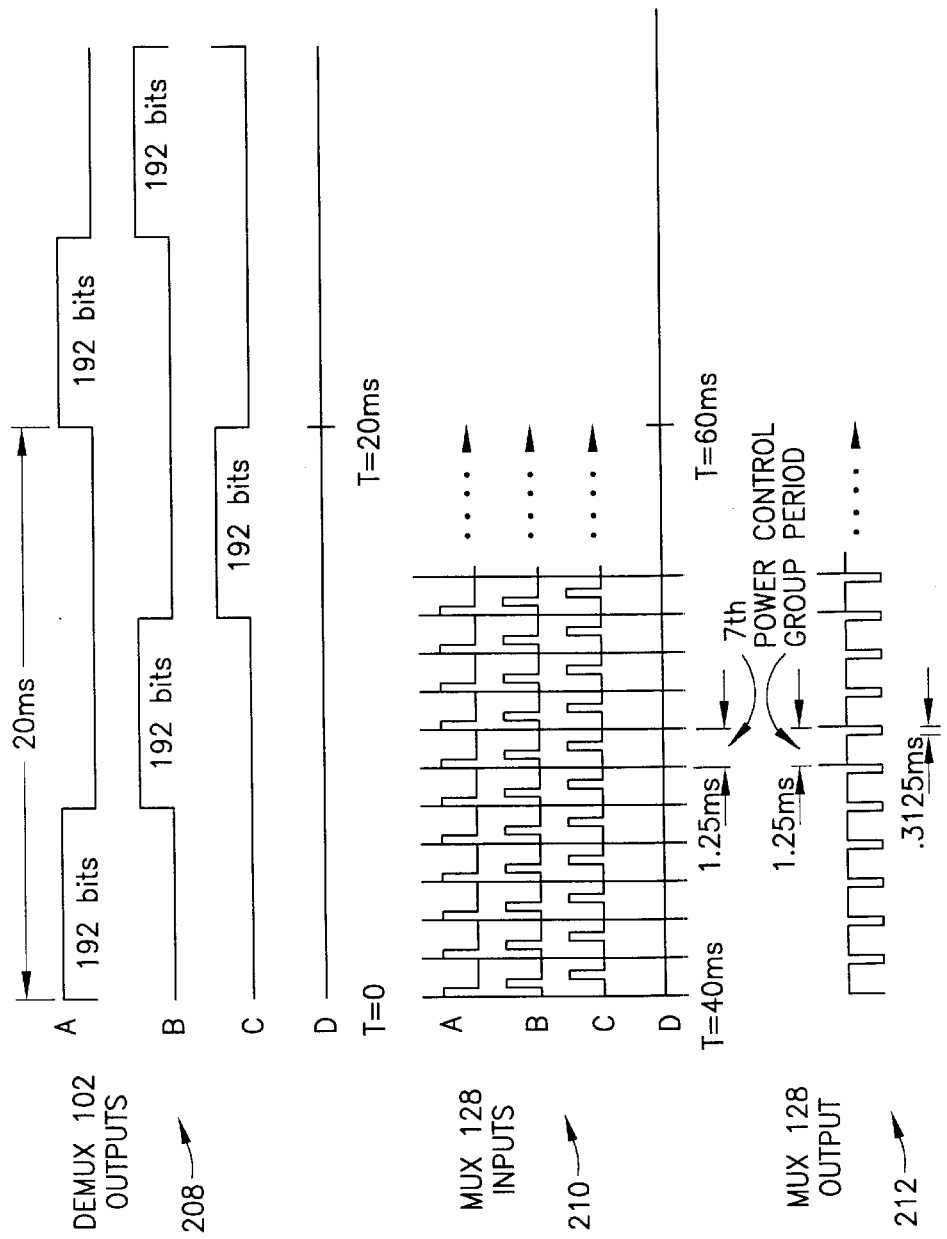

Referring now to FIGS. 3A and 3B, the signal-to-time plots therein illustrate timing diagrams of uplink transmissions according to the embodiment of the invention shown in FIG. 2A. FIG. 3A illustrates the transmission timing of three 1.25 ms power control group periods within each of four different 20 ms transmission frames 200–206 for the configuration of transmitter modulator 100 that is compatible with IS-95-A. Transmission frame 200 illustrates 9.6 kbps data transmission, frame 202 illustrates 19.2 kbps data transmission, frame 204 illustrates 28.8 kbps data transmission, and frame 206 illustrates 38.4 kbps data transmission. The first, second, and last power control group periods of each transmission frame are shown. FIG. 3B illustrates internal signal timing within transmitter modulator 100 with a series of 20 ms transmission frames for 28.8 kbps data transmission. Diagram 208 illustrates the timing of the signals on outputs A–D of DEMUX 102, diagram 210 illustrates the timing of the signals on inputs A'–D' of MUX 128, and diagram 212 illustrates the output of MUX 128.

In operation, when data is to be transmitted at a rate of 9.6 kbps or less, DEMUX 102 switches the received data to the first subchannel SC1, that is formed by the transmission path from output A through CC/INT 104, Walsh mod 112, and data burst randomizer 120 to input A' of MUX 128. The received data may be in the form of one or more full rate data frames of a duration of 20 ms each. The first subchannel SC1 then operates on the data in a manner equivalent to that which was described for the embodiment of FIG. 2A for the first subchannel in the case of a 9.6 kbps or slower transmission rate. However, Walsh modulator 112 outputs the data within the first 0.3125 ms of each 1.25 ms power control group period in a 20 ms transmission frame rather than taking the whole 1.25 ms period. The result at the output of Walsh mod. 112 is a stream of Walsh symbols at the rate of 4.8 ksps (a thousand Walsh symbols per second). For data rates less than 9.6 kbps, the symbol rate is proportionately reduced by causing one eighth or more of the quarter periods to be empty of data. For 4.8 kbps, 2.4 kbps, or 1.2 kbps data rates, data burst randomizer 120 may be used to randomize the power control group period used and its location in a frame. Each frame is then spread in long code spreader 138, I PN spreader 134, and Q PN spreader 136. As shown in frame 200 of FIG. 3A, at a data transmission rate of 9.6 kbps, one 0.3125 ms period of each 1.25 ms power control group period is filled with the data from the first subchannel SC1. For data rates less than 9.6 kbps, one 0.3125 ms period of each of an appropriate number of control group periods, of less than the total number of each of the sixteen power control group periods, is filled with data. Also, data burst randomizer 120 will randomize the location of the data among the control groups in the case of data rates less than 9.6 kbps. No symbols are sent during the time of the 1.25 ms period other than the 0.3125 ms period used for subchannel SC1. The actual modulation symbol burst transmission rate for this embodiment is fixed at a rate of 19.2 ksps, which results in an actual Walsh chip burst transmission rate of 1.2288 mcps (million chips per second). Since long code spreader 138 spreads each Walsh chip at a rate of 1.2288 mcps, each Walsh chip is spread by one PN chip. The spread Walsh symbols are then spread by an I PN sequence in I PN spreader 134 and a Q PN sequence in Q PN spreader 136 for transmission on the I and Q channels, respectively, and sent to the RF portion 146 of the transmitter. In order to keep the energy per transmitted bit constant, the data is transmitted at four times the rate as compared to the single channel case of the embodiment of FIG. 2A.

When data is transmitted at a rate of 19.2 kbps, two subchannels (SC1 and SC2) are used. Frame 202 of FIG. 3A illustrates the case of 19.2 kbps data transmission. At the 19.2 kbps rate subchannel SC1 and subchannel SC2 fill the first and second 0.3125 ms periods of each 1.25 ms power control group period in each 20 ms transmission frame. In the case of data transmission at 19.2 kbps, 19.2 kbps data received at input 140 of DEMUX 102 is multiplexed into the first and second subchannels SC1 and SC2 of transmitter modulator 100 at a rate of 9.6 kbps for each subchannel. This data may be in the form of two full rate data frames of 10 ms duration each. The data is then processed in each of the subchannels, SC1, SC2, in a manner identical to that in which the first subchannel SC1 processes data for transmission at 9.6 kbps, as was described for frame 200. Data processed in the first and second subchannel paths SC1 and SC2 of transmitter modulator 100 is then multiplexed and compressed by MUX 128 onto each 1.25 ms power control group period of each 20 ms frame. The symbols output from MUX 128 are then processed in a manner identical to that in which symbols are processed for 9.6 kbps data transmission and sent to the RF circuitry 146.

When data is transmitted at a rate of 28.8 kbps, 28.8 kbps data received at input 140 of DEMUX 102 is multiplexed into the first, second, and third subchannels SC1–SC3 of transmitter modulator 100 at a rate of 9.6 kbps for each subchannel. The received data may be in the form of at least three full rate data frames of a duration of 6.66 ms each. Diagram 208 of FIG. 3B illustrates the outputs A–D of DEMUX 102. Beginning at T=0, each group of 192 bits in the 576 bits received in a 20 ms period at input 140 is multiplexed to one of the outputs A, B, and C of DEMUX 102. The data is then processed in each of the subchannels in a manner similar to that in which the first subchannel SC1 processes data for transmission at 9.6 kbps, as was described for frame 200. At T=40 ms, the data from subchannels S1, S2, and S3 is input to channel inputs A', B', and C', respectively, of MUX 128. Diagram 210 illustrates the input timing of MUX 128. The data from each of the subchannels S1, S2, and S3 is received in the first, second, and third 0.3125 ms period, respectively, of each 1.25 ms period of each 20 ms transmission frame. The fourth 0.3125 ms period of each 1.25 ms period is left empty in this case of the 28.8 kbps rate. The data is received at each input of A', B', and C' at a Walsh symbol rate of 4.8 ksps. The data is then multiplexed by MUX 128. Diagram 212 illustrates the output of MUX 128 in this case. Data fills each of the first three of the four 0.3125 ms periods of each 1.25 ms period in the frame. The symbols output from MUX 128 are then processed, in a manner identical to that in which symbols are processed for 9.6 kbps data transmission, and sent to the RF portion 146 of the transmitter. Frame 204 of FIG. 3A illustrates a 20 ms transmission frame for the case of a 28.8 kbps data transmission rate. At the 28.8 kbps rate, data from subchannel SC1, data from subchannel SC2, and data from subchannel SC3 fills the first three of four 0.3125 ms periods of each 1.25 ms power control group period of each 20 ms transmission frame.

For a 38.4 kbps data transmission rate, all four 0.3125 ms periods of each 1.25 ms power control group period in a 20 ms transmission frame are used. Transmission frame 206 of FIG. 3A illustrates a 38.4 kbps data transmission frame. The operation of transmitter modulator 100 in this case is similar to that described for the 28.8 kbps data transmission case, with the exception that a fourth subchannel is enabled in transmitter modulator 100. Accordingly, 38.4 kbps data received at input 140 is multiplexed into each of the four subchannels SC1–SC4 of transmitter modulator 100 at 9.6 kbps. The data is then processed in the subchannels and input to inputs A', B', C', and D' of MUX 128 in the first, second, third, and fourth, 0.3125 ms periods, respectively, of each 1.25 ms time period of a 20 ms frame. The data is then multiplexed by MUX 128 and output such that data fills each of the four 0.3125 ms periods of each 1.25 ms period in a 20 ms transmission frame at the rate of 4.8 ksps for each input. Frame 206 of FIG. 3A illustrates a 20 ms transmission frame for the case of a 38.4 kbps data transmission rate. At the 38.4 kbps rate, data from subchannel SC1, data from subchannel SC2, data from subchannel SC3, and data from subchannel SC4 fills the first, second, third, and fourth 0.3125 ms periods, respectively, of each 1.25 ms power control group period.

The symbols output from MUX 128 are then processed, in a manner identical to that in which symbols are processed for 9.6 kbps data transmission, and sent to the RF circuitry 146 for transmission.

The embodiment of FIG. 2A may also be used to support the transmission of data at incremental rates between 9.6 and 38.4 kbps by operating a subchannel at a rate less than 9.6 kbps. For example, data may be transmitted at a rate of 14.4 kbps by using DEMUX 102 to multiplex received 14.4 kbps data into the first and second subchannels SC1 and SC2 at 9.6 kbps (full rate data frame) and 4.8 kbps (half rate data frame), respectively, and then using the second subchannel at half rate. In this case the second 0.3125 ms period of each 1.25 ms power control group is filled in only eight of the sixteen power control group periods of each 20 ms frame.

Figure 2C:
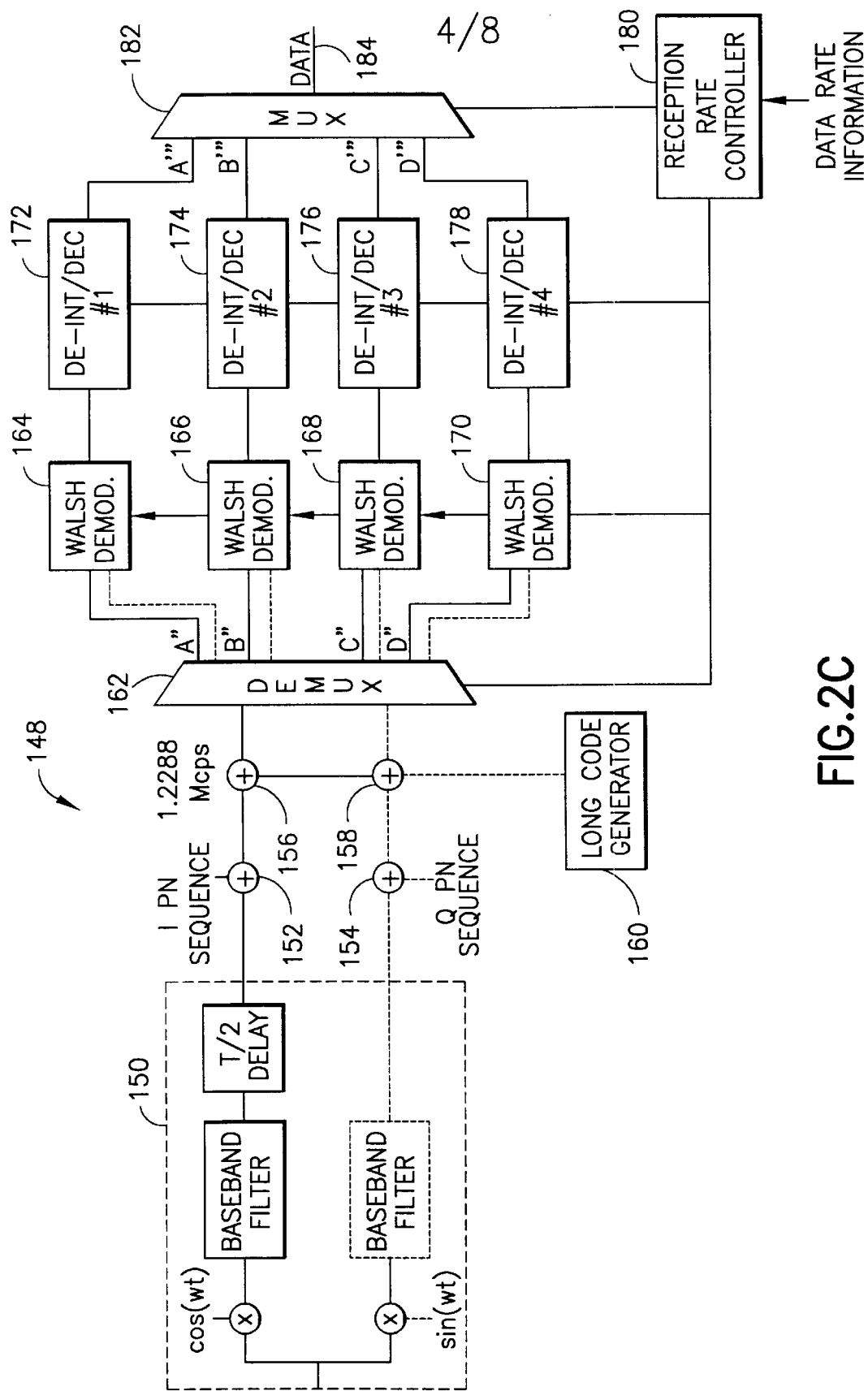
FIG. 2C is a schematic block diagram showing portions of a receiver/demodulator for transmitting variable rate data on a reverse link in the system of FIG. 1 according to an embodiment of the present invention.

Referring now to FIG. 2C, the schematic block diagram therein shows portions of a receiver/demodulator for receiving data on multiplexed subchannels according to an embodiment of the present invention. The receiver demodulator 148 may be implemented in base stations 2, 4, 6, 8, and/or 10, to provide reception of variable rate data transmitted on the reverse link 18. Receiver demodulator 148 includes receiver circuitry 150, I PN despreader 152, Q PN despreader 154, long code generator 160, I long code despreader 156, Q long code despreader 158, de-multiplexer (De-MUX) 162, Walsh demodulators (Walsh Demod.) 164, 166, 168, and 170, deinterleavers/decoders (Deint/Dec) 172, 174, 176, and 178, multiplexer (MUX) 182 and reception rate controller 180.

When a signal transmitted from a transmitter/modulator such as transmitter modulator 100 is received at receiver demodulator 148, the I channel signal is despread in I PN despreader 152, and the Q channel signal is despread in Q PN spreader 154. Each signal is then despread in long code despreaders 156 or 158. De-MUX 162 then demultiplexes the received data in a manner that is the reverse of the manner in which MUX 128 multiplexed the data in transmitter modulator 100. Each output A", B", C", D" of De-MUX 162 includes an I channel signal (solid line) and a Q channel signal (broken line). The demultiplexing in De-MUX 162 is done at the same rate as is the multiplexing in the transmitter modulator 100 by MUX 128. Data rate information is received at reception rate controller 180 before the data signal is received and reception rate controller 180 generates appropriate control information so that De-MUX 162, Walsh Demod.s 164, 166, 168, and 170, De-int/Decs 172, 174, 176, and 178, and MUX 182 demodulate the received data properly. For example, for a data reception rate of 38.4 kbps the input of De-MUX 162 at each channel (I and Q) would be identical to that in diagram 210 of FIG. 3B, while the outputs A", B", C", D" of De-MUX 162 would be identical to the waveforms at outputs A, B, C, D, respectively, of MUX 128 shown in diagram 208. Each Walsh Demod./De-int/Dec pair would process the data and the processed data would be input to inputs A", B", C", D" of MUX 182, 192 bits at a time. The waveforms of data input to inputs A'", B'", C'", D'" of MUX 182 would be identical to the waveforms for outputs A, B, C, D, respectively, of DEMUX 102 shown in diagram 206. A serial output data stream would then be output by MUX 182 at output 184. The output data stream at output 184 is identical, if received correctly, to the input serial data stream that was input to transmitter modulator 100 at input 140 in FIG. 2A.

Figure 4B:
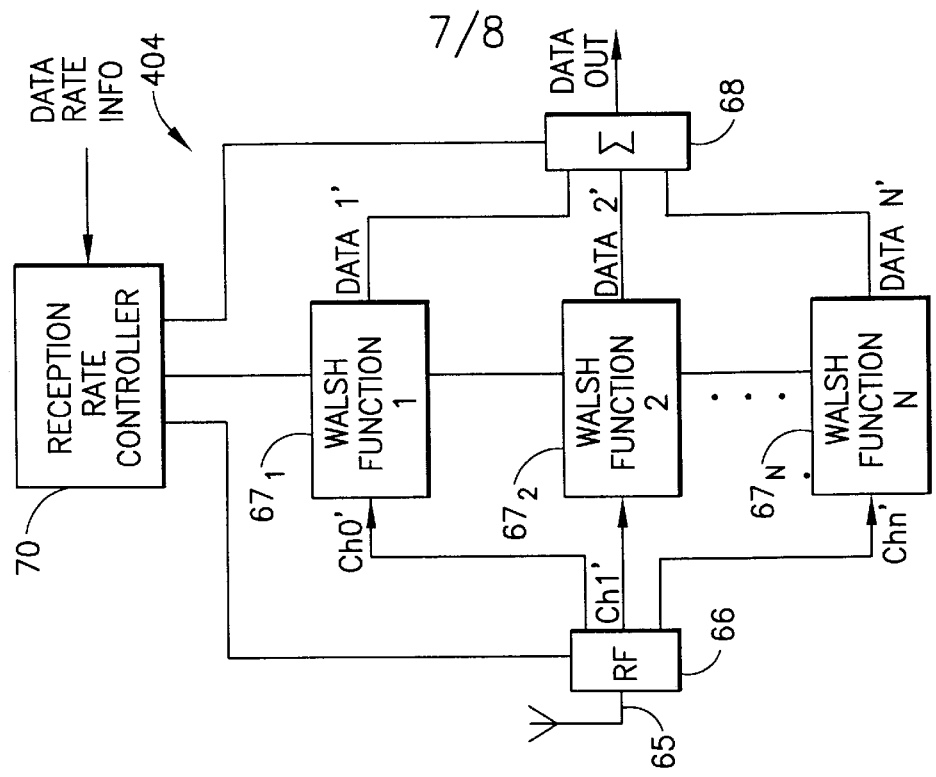
FIGS. 4A and 4B are schematic block diagrams showing portions of a transmitter/modulator and a receiver/demodulator, respectively, for transmitting variable rate data on a forward link according to an embodiment of the present invention.
Figure 4A:
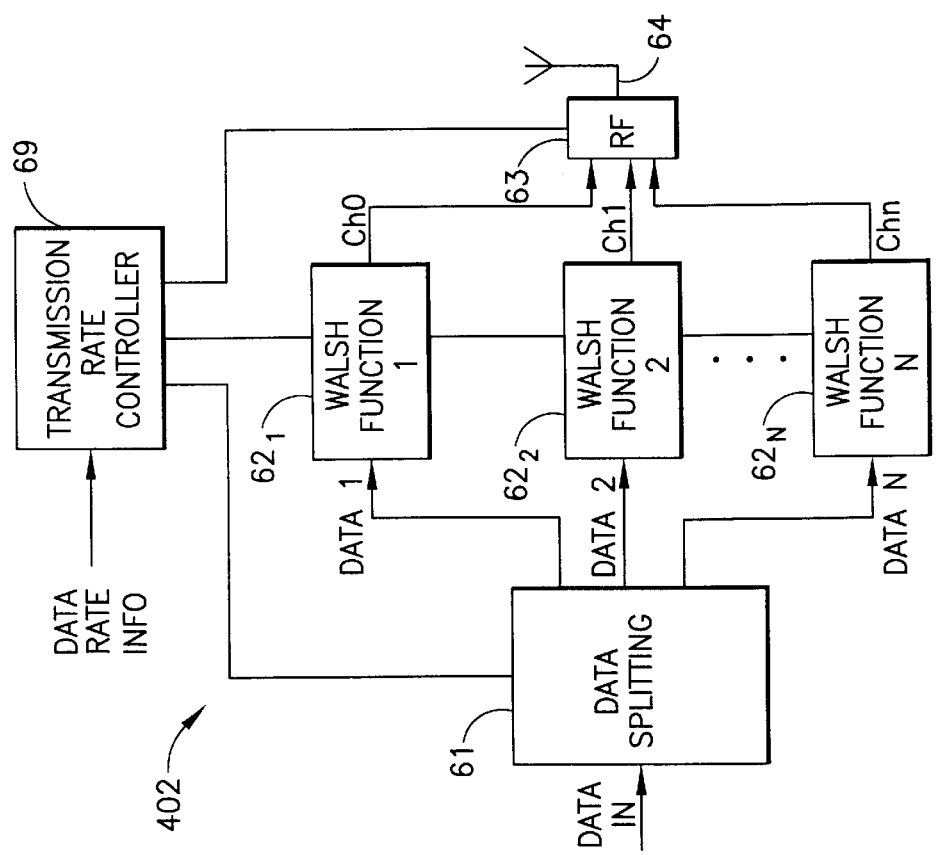

Referring now to FIGS. 4A and 4B, the schematic block diagrams therein generally illustrate portions of a transmitter modulator 402 and receiver demodulator 404, respectively, for providing variable rate data on a forward link according to an embodiment of the invention. Transmitter modulator 402 may be implemented in any of the base stations, 2, 4, 6, 8, and 10 of FIG. 1, and receiver demodulator 404 may be implemented in the mobile station 14 of FIG. 1, to provide variable rate data on the forward link 20. A high-speed data signal DATAIN that is to be transmitted over the radio path is divided in a data splitter 61 into the required number of slower-speed data signals DATA 1, DATA 2, . . . DATA N. The data transmission may be varied by varying the number N of parallel traffic channels utilized. In a CDMA system, a selected number N of parallel CDMA traffic channels ch0, ch1, . . . chn is allocated for the transmission. That is, an unique spreading code is allocated for each slower-speed signal DATA 1, DATA 2, . . . DATA N in order to distinguish them from each other during simultaneous transmission over the radio interface. The spreading codes of the system are preferably selected in such a way that the codes used in each system cell are mutually orthogonal, i.e., they do not correlate with each other. One class of suitable orthogonal binary sequences is called the Walsh function. In the embodiment shown in FIG. 4A, the traffic channel separation is done by coding (multiplying) each slower-speed data stream DATA 1 . . . DATA N by modified Walsh functions 1 . . . N of length 255 in respective Walsh encoders $62_1 \ldots 62_N$, in order to spread the data streams in bandwidth. The Walsh function is modified so that the last bits of all of the functions are deleted. The spread-spectrum data streams are fed through radio frequency (RF) parts 63 to an antenna 64 for transmission over the radio interface.

The transmitted RF signal, received at receiving antenna 65, as shown in FIG. 4B, is fed through RF parts 66 and split in parallel CDMA traffic channels ch0', ch1', . . . chn' or correlator branches to correlators $67_1 \ldots 67_N$. Correlators $67_1 \ldots 67_N$ are Walsh decoders, each of which decodes (multiplies) the received spread-spectrum signal by the Walsh function 1 . . . N of the respective CDMA traffic channel ch0', ch1', . . . chn', in order to despread the signal in bandwidth and to restore the original bandwidth of the respective slower-speed data streams DATA 1 . . . DATA N. The restored slower-speed data streams DATA 1' . . . DATA N' are then combined in a combiner 68 into a high-speed data stream DATAOUT.

Typically, there are various coding and signal processing operations, such as channel coding (convolutional coding), symbol repetition, interleaving, etc., as indicated in FIG. 4B, involved with the data transmission. These additional operations are not essential with respect to the present invention but may be used in the implementation. In the embodiment of FIGS. 4A and 4B, it is assumed that these coding and interleaving operations, if any, are done to the high-speed data streams DATAIN and DATAOUT prior to the data splitting in splitter 61 and subsequent to the data combining in combiner 68.

As noted, the data transmission rate for the forward link may be varied by utilizing a variable number of the N parallel traffic channels (DATA 1–DATA N). This varying function may be controlled by transmission rate controller 69 in transmitter modulator 402 and reception rate controller 70 in receiver demodulator 404. Accordingly, a variable rate symmetric/asymmetric data link, using a forward link 20 and a reverse link 18, may be set up between mobile station 14 and a base station, e.g., base station 8 of FIG. 1, for exchanging service type messages with information records in accordance with the invention.

Referring now to FIGS. 5A and 5B, information fields in such service type messages utilizing the asymmetric rates bit of the invention are illustrated therein. FIG. 5A shows an High Speed Data (HSD) Service Configuration information record including fields for service type data, an asymmetric rates bit, forward link rate data, reverse link rate data, and additional control data. FIG. 5B shows an information record as in FIG. 5A, but without reverse link rate data, as is the case when the ASYMMETRIC_RATES bit field indicates that the data rate of the forward and reverse links are the same. These information records may be transmitted from either a mobile station (MS), such as station 14 of FIG. 1, to a base station (BS), such as any one of stations 2, 4, 6, 8, and 10, or from one of the base stations to the mobile station. Such an information record may be included in a Status Response Message, a Service Request Message, a Service Response Message, or a service Connect Message, and also may be included in a Current Service Request Message. As will be understood, a Status Response Message is sent in response to a request for the current service configuration, a Service Request Message is transmitted to start service negotiation. Service Response Messages may be used during service negotiation together with Service Request Messages to negotiate the service configuration. The Service Response Message may be used together with the Service Request Message to negotiate the forward and reverse link data transmission rates. A Service Connect Message is sent from a base station to a mobile station to specify the actual configuration used after a negotiation. Service Request, Response, and Connect Messages may include zero or one information record and that record may be an High Speed Data (HSD) Service Configuration information record of the type such as shown in FIGS. 5A and 5B. A Status Response Messsage includes those information records that are requested by sending a Status Request Message. One of those information records may be an HSD Service Configuration record, such as shown in FIGS. 5A and 5B. Also, a Service Connect Message may include an HSD Service Configuration information record which is used when the Service Connect Message is sent from a base station to a mobile station to specify the actual service configuration to be utilized after negotiation.

An embodiment of the present invention for improving the form of the signaling messages used for setting up the speed rates between multiplexed channels in a code division multiple access (CDMA) telecommunications system based on the IS-95 standard, such as described with reference to FIGS. 1 through 5B, by shortening the time and signal length required in the connection setup of such a system will now be described in detail.

The contents of an information record in accordance with the present invention are illustrated in TABLE 1 as a preferred form of High Speed Data (HSD) Service Configuration information record. TABLE 1 shows the message fields in the connection setup framework and the number of binary bits allocated to identifying, by code, the information contained in each field. It is an example of the information included in the Service Request and Service Response Messages, and used during the negotiation of the High Speed Data service configuration. It is also included in the Status Response Message to indicate the current configuration of the personal station. This exemplary information record is based on the Service Configuration Information Record with only some HSD related fields being added, and explains how the personal station should use this record in the various messages.

TABLE 1

HSD Service Configuration information record

| Type-Specific Field | Length (bits) |
| --- | --- |
| ASYMMETRIC_RATES | 1 |
| FOR_RATE_SET | 4 |
| REV_RATE_SET | 4 |
| FOR_MUX_OPTION | 16 |
| REV_MUX_OPTION | 0 or 16 |
| SERVICE_TYPE | 3 |
| FOR_SUB_RATE_1 | 0 or 8 |
| FOR_SUB_RATE_2 | 0 or 8 |
| FOR_SUB_RATE_3 | 0 or 8 |
| FOR_SUB_RATE_4 | 0 or 8 |
| REV_SUB_RATE_1 | 0 or 8 |
| REV_SUB_RATE_2 | 0 or 8 |
| REV_SUB_RATE_3 | 0 or 8 |
| REV_SUB_RATE_4 | 0 or 8 |
| FOR_PREF_MAX_RATE | 0 or 8 |
| REV_PREF_MAX_RATE | 0 or 8 |
| FOR_ACCEPT_MAX_RATE | 8 |
| REV_ACCEPT_MAX_RATE | 0 or 8 |
| FOR_CURRENT_RATE | 0 or 8 |
| REV_CURRENT_RATE | 0 or 8 |
| MOV_STATIONARY | 1 |
| NUM_CON_REC | 8 |
| NUM_CON_REC occurrences of the following record | |
| RECORD_LEN | 8 |
| CON_REF | 8 |
| SERVICE_OPTION | 16 |
| FOR_TRAFFIC | 4 |
| REV_TRAFFIC | 4 |
| SERVICE_QUALITY | 3 |
| RESERVED | 0–7 (as needed) |

These fields are included in a Status Response Message to return the current service configuration, and in a Service Request Message and a Service Response Message to propose a service configuration.

The codes to be used for the setup fields of TABLE 1 are as follows:

ASYMMETRIC_RATES—Asymmetric rates.

In the case when both forward and reverse links use the same rate configuration, i.e., the same multiplex option number and rate set number and the same rates, it is not necessary to convey duplicate rate information. Rather, in accordance with the invention, the ASYMMETRIC_RATES bit in the signaling message is set to one binary value, e.g., '0', to indicate that the same rate configuration is used for both directions. Then only one rate configuration is encoded in the signaling message. Accordingly, if the ASYMMETRIC_RATES field is set to '0', the data for the following fields will not be included in the message:

REV_RATE_SET
REV_MUX_OPTION
REV_ACCEPT_MAX_RATE
REV_PREF_MAX_RATE
REV_CURRENT_RATE
REV_SUB_RATE_1
REV_SUB_RATE_2
REV_SUB_RATE_3
REV_SUB_RATE_4

The message will thus be shortened to the following form:

| | |
| --- | --- |
| ASYMMETRIC_RATES | 1 |
| FOR_RATE_SET | 4 |
| FOR_MUX_OPTION | 16 |
| SERVICE_TYPE | 3 |

-continued

| | |
|---|---|
| FOR_SUB_RATE_1 | 0 or 8 |
| FOR_SUB_RATE_2 | 0 or 8 |
| FOR_SUB_RATE_3 | 0 or 8 |
| FOR_SUB_RATE_4 | 0 or 8 |
| FOR_PREF_MAX_RATE | 0 or 8 |
| FOR_ACCEPT_MAX_RATE | 8 |
| FOR_CURRENT_RATE | 0 or 8 |
| MOV_STATIONARY | 1 |
| NUM_CON_REC | 8 |
| NUM_CON_REC occurrences of the following record | |
| RECORD_LEN | 8 |
| CON_REF | 8 |
| SERVICE_OPTION | 16 |
| FOR_TRAFFIC | 4 |
| REV_TRAFFIC | 4 |
| SERVICE_QUALITY | 3 |
| RESERVED | 0–7 (as needed) |

In the case when the forward and reverse links use different rate configurations, the ASYMMETRIC-RATES bit in the signaling message is set to the other binary value, i.e., '1', to indicate that two different rate configurations are encoded in the signaling message. Then both configurations are included in the message so that all the fields are used and the message length is conventional as shown in TABLE 1.

Thus, for a Status Response Message, the personal station may set the ASYMMETRIC-RATES field to '0' if the Forward Traffic Channel and Reverse Traffic Channel transmission rates in the current service configuration are the same. The personal station will then set this field to '1' if the Forward Traffic Channel and Reverse Traffic Channel transmission rates in the current service configuration are not the same.

For a Service Request Message and a Service Response Message, the personal station shall set this field to '0' if the Forward Traffic Channel and Reverse Traffic Channel transmission rates in the proposed service configuration are to be the same. The personal station shall set this field to '1' if the Forward Traffic Channel and Reverse Traffic Channel transmission rates in the proposed service configuration are not to be the same.

The function of the HSD other information fields is as follows.

FOR_RATE_SET—Forward Traffic Channel rate set

For a Status Response Message, the personal station sets this field to the number of the rate set for the current service configuration (e.g., 3 corresponds to Rate Set 3). For a Service Request Message and a Service Response Message, the personal station sets this field to the number of the rate set for the proposed service configuration (e.g., 1 corresponds to Multiplex Option 1).

FOR_MUX_OPTION—Forward Traffic Channel multiplex option.

For a Status Response Message, the personal station shall set this field to the number of the Forward Traffic Channel multiplex option for the current service configuration (e.g., 1 corresponds to Multiplex Option 1).

For a Service Request Message and a Service Response Message, the personal station shall set this field to the number of the Forward Traffic Channel multiplex option for the proposed service configuration.

SERVICE_TYPE—Service Type.

For a Status Response Message, the mobile or personal station sets this field to the SERVICE_TYPE code, such as shown in TABLE 2 below, corresponding to the service type in use in the current service configuration.

For a Service Request Message and a Service Response Message, the personal station sets this field to the SERVICE_TYPE code shown in TABLE 2 corresponding to the service type for the proposed service configuration.

TABLE 2

SERVICE_TYPE Codes

| SERVICE_TYPE (binary) | Description |
|---|---|
| 000 | Fixed Rate Service |
| 001 | Multi-Rate Service |
| 010 | Dynamic Rate Service |
| All other SERVICE_TYPE codes are reserved. | |

Fixed Rate Service—the data rate remains constant for the duration of the call.

Multi-Rate Service—the data rate can be adjusted by re-negotiation with the network during the call.

Dynamic Rate Service—the data rate is allowed to vary dynamically during the call.

The form of the message shown in TABLE 1 will change somewhat with the Service Type that is set. For example, the SUB_RATE fields are used only during Dynamic Rate Service, while the CURRENT_RATE fields are used only during Multi-Rate Service. The PREF_MAX_RATE field is not used with Fixed Rate Service.

FOR_ACCEPT_MAX_RATE—Forward Traffic Channel acceptable maximum rate.

This field consists of the SUB_RATE code corresponding to the Forward Traffic Channel acceptable maximum rate for the connection.

For a Status Response Message, the personal station sets this field to the SUB_RATE code corresponding to the Forward Traffic Channel acceptable maximum rate for the current service configuration.

For a Service Request Message and a Service Response Message, the personal station shall set this field to the SUB_RATE code corresponding to the Forward Traffic Channel acceptable maximum rate for the proposed service configuration.

FOR_PREF_MAX_RATE—Forward Traffic Channel preferred maximum rate.

If SERVICE_TYPE='001' (Multi-Rate), or '010' (Dynamic Rate), this field consists of the SUB_RATE code corresponding to the Forward Traffic Channel preferred maximum rate for the connection. If SERVICE_TYPE='000' (Fixed Rate), this field shall not be included in the message.

For a Status Response Message, the personal station shall set this field to the SUB_RATE code corresponding to the Forward Traffic Channel preferred maximum rate for the current service configuration.

For a Service Request Message and a Service Response Message, the personal station shall set this field to the SUB_RATE code corresponding to the Forward Traffic Channel preferred maximum rate for the proposed service configuration.

FOR CURRENT RATE—Forward Traffic Channel current transmission rate

If SERVICE_TYPE='001' (Multi-Rate), this field consists of the SUB_RATE code corresponding to the Forward Traffic Channel current transmission rate for the connection. If SERVICE_TYPE='000' (Fixed Rate) or '010' (Dynamic Rate), this field shall not be included in the message.

For a Status Response Message, the personal station shall set this field to the SUB_RATE code corresponding to the Forward Traffic Channel current transmission rate for the current service configuration.

For a Service Request Message and a Service Response Message, the personal station shall set this field to the SUB_RATE code corresponding to the Forward Traffic Channel current transmision rate for the current proposed service configuration.

FOR_SUB_RATE_N—Forward Traffic Channel subrates.

If SERVICE_TYPE='010', these fields consist of the SUB_RATE codes (to be defined for each HSD Rate Set). If SERVICE_TYPE='000' or '001', these fields shall not be included in the message.

For a Status Response Message, the personal station shall set these fields to the SUB_RATE codes corresponding to the Forward Traffic Channel subrates in use in the current service configuration.

For a Service Request Message and a Service Response Message, the personal station shall set these fields to the SUB_RATE codes corresponding to the Forward Traffic Channel subrates for the proposed service configuration.

REV_RATE_SET—Reverse Traffic Channel rate set

REV_MUX_OPTION—Reverse Traffic Channel multiplex option

REV_ACCEPT_MAX_RATE—Reverse Traffic Channel acceptable maximum rate

REV_PREF_MAX_RATE—Reverse Traffic Channel preferred maximum rate

REV_CURRENT_RATE—Reverse Traffic Channel current transmission rate

REV_SUB_RATE_N—Reverse Traffic Channel subrates

All of the preceding REV_ fields relate to the Reverse Traffic Channel and contain information corresponding to that of the related FOR_ fields of the Forward Traffic Channel.

MOV_STATIONARY—Moving/Stationary indicator.

The personal station sets this field to one binary value, e.g., '0', if the personal station is stationary, or it sets this field to the other binary value, i.e., '1', if the personal station is moving.

NUM_CON_REC—Number of service option connection records

The personal station sets this field to the number of service option connection records included in the message.

For a Status Response Message, the personal station shall include one occurrence of the seven-field record following this field for each service option connection of the current service configuration.

For a Service Request Message and a Service Response Message, the personal station shall include one occurrence of the following seven-field record for each service option connection of the proposed service configuration.

RECORD_LEN—Service option connection record length

The personal station shall set this field to the number of octets included in this service option connection record.

CON_REF—Service option connection reference

For a Status Response Message, the personal station sets this field to the service option connection reference. For a Service Request Message and a Service Response Message, if the service option connection is part of the current service configuration, the personal station shall set this field to the service option connection reference; otherwise, the personal station shall set this field to '00000000'.

SERVICE_OPTION—Service option

For a Status Response Message, the personal station shall set this field to the service option in use with the service option connection. For a Service Request Message and a Service Response Message, the personal station shall set this field to the service option to be used with the service option connection.

FOR_TRAFFIC—Forward Traffic Channel traffic type

For a Status Response Message, the personal station shall set this field to the FOR_TRAFFIC code, set forth in TABLE 3 below, corresponding to the Forward Traffic Channel traffic type in use with the service option connection.

For a Service Request Message and a Service Response Message, the personal station shall set this field to the FOR_TRAFFIC code of TABLE 3 corresponding to the Forward Traffic Channel traffic type to be used with the service option connection.

TABLE 3

FOR_TRAFFIC Codes

| FOR_TRAFFIC (binary) | Description |
|---|---|
| 0000 | The service option does not use Forward Traffic Channel traffic. |
| 0001 | The service option connection uses primary traffic on the Forward Traffic Channel. |
| 0010 | The service station connection uses secondary traffic on the Forward Traffic Channel. |
| All other FOR_TRAFFIC codes are reversed. | |

REV_TRAFFIC—Reverse Traffic Channel traffic type

For a Status Response Message, the personal station sets this field to the REV_TRAFFIC code, such as set forth in TABLE 4 below, corresponding to the Reverse Traffic Channel type in use with the service option connection.

For a Service Request Message and a Service Response Message, the personal station sets this field to the REV_TRAFFIC code of TABLE 4 corresponding to the Reverse Traffic Channel traffic type to be used with the service option connection.

TABLE 4

REV_TRAFFIC Codes

| REV_TRAFFIC (binary) | Description |
|---|---|
| 0000 | The service option connection does not use Reverse Traffic Channel traffic. |
| 0001 | The service option connection uses primary traffic on the Reverse Traffic Channel. |
| 0010 | The service option connection uses secondary traffic on the Reverse Traffic Connection. |
| All other REV_TRAFFIC codes are reversed. | |

SERVICE_QUALITY—Service quality

For a Status Response Message, the personal station shall set this field to the SERVICE_QUALITY code, such as set forth in TABLE 5 below, corresponding to the service quality for the current configuration.

For a Service Request Message and a Service Response Message, the personal station shall set this field to the SERVICE_QUALITY code of TABLE 5 corresponding to the service quality for the proposed service configuration.

TABLE 5

SERVICE_QUALITY Codes

| Service Quality (binary) | Description |
| --- | --- |
| 000 | Uncoded Service. |
| 001 | Bit Error Rate $10_{-4}$ Service. |
| 010 | Bit Error Rate $10_{-6}$ Service. |
| All other SERVICE_QUALITY codes are reversed. | |

TABLE 6

EHD Message Additional Fields

| Field | Length (bits) |
| --- | --- |
| RATES_INCLUDED | 1 |
| ASYMMETRIC_RATES | 0 or 1 |
| FOR_CURRENT_RATE | 0 or 8 |
| REV_CURRENT_RATE | 0 or 8 |
| NUMBER_OF_PILOTS | 4 |
| "number of pilots" occurrences of the following field: | |
| NUM_CODE_CHAN | 4 |
| RESERVED | 0 or 4 (as needed) |

The (HSD) Service Configuration information record included in the Service Connect Message may comprise the same fields as described in TABLE 1, with the exception that the data values in the Service Connect Message specify the actual values to be used upon completion of the data rate negotiation.

The base station (BS) may also send a Current Rate Modify Message to the mobile station (MS) during an high speed data call to instruct the MS to modify the current rate. This message may be of the following form:

TABLE 7

Current Rate Modify message information record

| Field | Length (bits) |
| --- | --- |
| MSG_TYPE | 8 |
| ACK_SEQ | 3 |
| MSG_SEQ | 3 |
| ACK_REQ | 1 |
| ENCRYPTION | 2 |
| USE_TIME | 1 |
| ACTION_TIME | 6 |
| MODIFY_SEQ | 2 |
| MODIFICATION_TYPE | 1 |
| ASYMMETRIC_RATES | 1 |
| FOR_CURRENT_RATE | 8 |
| REV_CURRENT_RATE | 0 or 8 |
| ADD_LENGTH | 3 |
| Additional fields | 8 × ADD_LENGTH |
| Zero or more occurrences of the following record: | |
| PILOT_PN | 9 |
| PWR_COMB_IND | 1 |
| NUM_CODE_CHAN | 4 |
| NUM_CODE_CHAN_occurrences of the following field: | |
| CODE_CHANi | 8 |
| RESERVED | 0–7 (as needed) |

The information contained in the fields is as follows:
MSG_TYPE—Message type.
ACK_SEQ—Acknowledgement sequence number.
MSG_SEQ—Message sequence number.
ACK_REQ—Acknowledgement required indicator.
ENCRYPTION—Message encryption indicator.
USE_TIME—Use action time indicator.
  This field indicates whether an ACTION_TIME is specified in this message. If an ACTION_TIME is specified in this message, the base station shall set this field to '1'. Otherwise, the base station shall set this field to '0'.
ACTION_TIME—Action time.
  If the USE_TIME field is set to '1', the base station shall set this field to the System Time, in units of 80 ms (modulo 64), at which the handoff is to take effect. If the USE_TIME field is set to '0' the base station shall set this field to '000000'.
MODIFY_SEQ—Modification Type
  If MODIFICATION TYPE=0, the current rate is increased and if code channels are included, those code channels are added to the current configuration.
  If MODIFICATION TYPE=1, the current rate is decreased and if code channels are included, those code channels are removed from the current configuration.
ASYMMETRIC_RATES—Asymmetric rates
  If this field is set to '0', the REV_CURRENT_RATE field shall not be included in this message. The base station shall set this field to '0' if the Forward Traffic Channel and Reverse Traffic Channel current transmission rates are the same. The base station shall set this field to '1' if the Forward Traffic Channel and Reverse Traffic Channel current transmission rates are not the same.
FOR_CURRENT_RATE—The new current rate for the Forward Traffic Channel.
  If FOR_CURRENT_RATE is not changed, it is set to 0.
REV_CURRENT_RATE—The new current rate for the Reverse Traffic Channel.
  If REV_CURRENT_RATE is not changed, it is set to 0.
ADD_LENGTH—Number of octets in the additional fields.
Additional fields—If ADD_LENGTH is not set to '0', then the base station shall include one occurrence of the following four-field record for each member of the personal station's new Active Set.
PILOT_PN—Pilot PN sequence offset index.
  The base station shall set this field to the pilot PN sequence offset for this pilot in units of 64 PN chips.
PWR_COMB_IND—Power control symbol combining indicator.
  If the Forward Traffic Channel associated with this pilot will carry the same closed-loop power control subchannel bits as that of the previous pilot in this message, the base station shall set this field to '1'. Otherwise, the base station shall set this field to '0'. For the first occurrence of this record in the message, the base station shall set this field to '0'.
NUM_CODE_CHAN—Number of code channels to add or remove.
  The base station shall set this field to the number of code channels that the personal station is to add or remove on the Forward Traffic Channel associated with this pilot.
CODE_CHAN—Code channel index.
  The base station shall set this field to the code channel index in the range 1 to 63 inclusive that the personal station is to add or remove on the Forward Traffic Channel associated with this pilot.
RESERVED—Reserved bits.
  The base station shall add reserved bits as needed in order to make the length of the entire message equal to an integer number of octets. The base station shall set these bits to '0'.
  When the modifications have been completed, the personal station sends a Current Rate Modify Completion Message. The Current Rate Modify Message may also be sent by the BS in response to a Current Rate Modify Request Message from the MS. The Current Rate Modify Request Message may also include the HSD information field.

An example of an exchange of messages between a mobile station (MS) and a base station (BS) for achieving an immediate HSD connection with service negotiation for the former case of a mobile originated HSD call may comprise the following exchange:

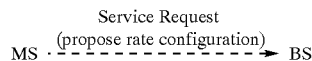

If the BS accepts the proposed or requested rate configuration, then:

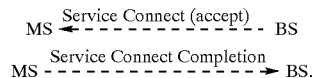

If the BS cannot provide the requested rate configuration, the BS may propose a lower rate ($\geq$ acceptable maximum rate), for example,:

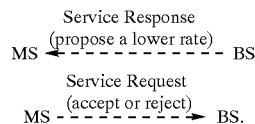

If the MS accepts the proposed rate, then:

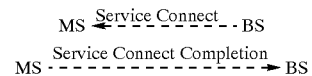

Upon the sending of the Service Connect Completion message in either of the foregoing message exchanges, High Speed Data call connection initiated by the MS is established.

For an example of a mobile terminated HSD call, an immediate HSD connection with service negotiation can be established with the following sequence of messages:

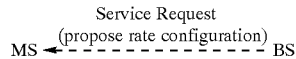

If the MS accepts the requested rate configuration, then:

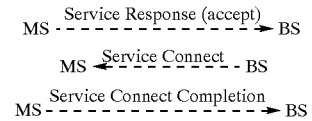

whereupon, High Speed Data call connection initiated by the BS is established.

The MS may originate rate re-negotiation during an High Speed Data call with the following message exchange:

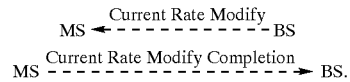

if the BS accepts the request, then:

MS ←--- Current Rate Modify ---BS
MS --- Current Rate Modify Completion ---→ BS.

If the rate change is not possible, then the following message is sent:

MS --- Current Rate Modify Rejected ---→ BS.

If the newly agreed data rates resulting from the Current Rate Modify messages require changes in the assigned Walsh channels, then the Current Rate Modify and the Current Rate Modify Completion messages can be used to facilitate the additional assignment or partial release of the Walsh codes with the following exchange:

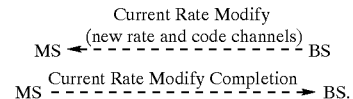

In each of the examples illustrated above, if it is necessary to include an HSD Service Configuration information record in a message, the message may be shortened by utilizing the ASYMMETRIC_RATES bit field when the proposed or acceptance rates for the reverse and forward link are symmetric.

It will therefore be seen that an apparatus and method for providing an improved high speed data rate service in a cellular system has been disclosed wherein shortening of the time and signal length required in the connection setup of such a system is achieved through reducing the number of separate fields required in signal messages used in the connection setup by eliminating the encoding of the rate configuration for the reverse link when both forward and reverse links use the same rate configuration. While the invention has been particularly described in terms of an IS-95 CDMA embodiment, it will be understood that it also may have application to any telecommunications system using two separate single-direction transmission channels between transceiving devices.

What is claimed is:

1. A system for shortening the time and signal length of signal messages, having a plurality of informational message fields used in the connection setup for a high speed data rate service in a CDMA cellular network having forward and reverse links with encoded rate configurations, comprising:

means for determining if both forward and reverse links are to use the same rate configuration and for producing an indication when said rate configurations are determined to be the same; and means, responsive to said indication, for modifying the signal messages by reducing the number of separate informational message fields therein through eliminating the encoding of the rate configuration for the reverse link.

2. The system of claim 1 wherein said plurality of informational message fields includes an ASYMMETRIC_RATES bit field comprising a binary bit and said modifying means comprises means for setting the binary bit in the ASYMMETRIC_RATES field in the signal message to a binary value selected to indicate that both forward and reverse links are to use the same rate configuration.

3. The system of claim 1 wherein said plurality of informational message fields comprise fields for:

ASYMMETRIC_RATES; FOR_RATE_SET; REV_RATE_SET; FOR_MUX_OPTION; REV_MUX_OPTION; SERVICE_TYPE; FOR_SUB_RATE_N; REV_SUB_RATE_N; FOR_PREF_MAX_RATE; REV_PREF_MAX_RATE; FOR_ACCEPT_MAX_RATE; REV_ACCEPT_MAX_RATE; FOR_CURRENT_RATE; REV_CURRENT_RATE; MOV_STATIONARY; and NUM_CON_REC.

4. The system of claim 3 wherein said NUM_CON_REC occurrences comprise the following record fields:

RECORD_LEN; CON_REF; SERVICE_OPTION; FOR_TRAFFIC; REV_TRAFFIC; SERVICE_QUALITY.

5. The system of claim 1 wherein said informational message fields comprise additional fields for an Extended Handoff Direction Message, said additional fields comprising:

RATES_INCLUDED; ASYMMETRIC_RATES; FOR_CURRENT_RATE; REV_CURRENT_RATE; NUMBER_OF_PILOTS; and the "number of pilots" occurrences of the following field: NUM_CODE_CHAN.

6. In a telecommunications system having a plurality of transceiving devices, wherein communications between a pair of transceiving devices are carried on one of a plurality of data channels, each with a first link and a second link, an apparatus for configuring a data channel comprising:

a transceiving device for transmitting on the first link and receiving on the second link of a data channel, said transceiving device comprising;

first means for determining a rate configuration for each of said first link and said second link for a call on said data channel;

second means for determining whether said rate configuration for said first link and the rate configuration for said second link, determined in said first means, are equal and indicating a positive or negative result;

means for transmitting, in response to an indication of a positive result by said second means, a first message on said data channel including a first rate configuration field indicating both said rate configuration for said first link and said rate configuration for said second link; and means for transmitting, in response to an indication of a negative result by said second means, a second message on said data channel including a second rate configuration field indicating said rate configuration for said first link and a third rate configuration field indicating said rate configuration for said second link.

7. The apparatus of claim 6, wherein said telecommunications system comprises a cellular telecommunications system and said transceiving device comprises a mobile station.

8. The apparatus of claim 6, wherein said telecommunications system comprises a cellular telecommunications system and said transceiving device comprises a base station.

9. A method for shortening the time and signal length of signal messages, having informational message fields used in the connection setup for high speed data (HSD) rate service calls in a cellular system, having forward and reverse links with encoded rate configurations, operating between a mobile station (MS) and a base station (BS), comprising the steps of:

determining if both forward and reverse links are to use the same rate configuration; and if so, modifying the signal messages by reducing the number of separate informational message fields required therein by eliminating the encoding of the rate configuration for the reverse link.

10. The method of claim 9 wherein said informational message fields include an ASYMMETRIC_RATES bit field comprising a binary bit and said modifying step comprises selecting the setting of the binary bit in the ASYMMETRIC_RATES field in the signal message to indicate that both forward and reverse links are to use the same rate configuration.

11. The method of claim 10 wherein the exchange of signal messages for the connection setup with service negotiation for completing an MS originated HSD call to the BS comprises the following exchange of message steps:

sending a Service Request (propose rate configuration) signal message from an MS to the BS;

if the BS accepts the requested rate configuration, then:
sending a Service Connect (accept) signal message to the MS from the BS; and
sending a Service Connect Completion signal message from the MS to the BS;
whereupon the HSD call connection initiated by the MS is completed.

12. The method of claim 11 further comprising, when the BS cannot provide the requested rate, the BS proposes a lower rate ($ acceptable maximum rate) by the following message steps:

sending a Service Response (propose a lower rate) signal message to the MS from the BS; and sending a Service Request (accept or reject) signal message from the MS to the BS;

if the MS accepts the proposed rate, then:
sending a Service Connect signal message to the MS from the BS; and
sending a Service Connect Completion signal message from the MS to the BS;
whereupon the HSD call connection initiated by the MS is completed.

13. The method of claim 10 wherein the exchange of messages for the connection setup with service negotiation for completing an MS terminated HSD call from a BS comprises the following exchange of message steps:

sending a Service Request (propose rate configuration) signal message to the MS from the BS;

if the MS accepts the requested rate, then:
sending a Service Response (accept) signal message from the MS to the BS;
sending a Service Connect signal message to the MS from the BS; and
sending a Service Connect Completion signal message from the MS to the BS;
whereupon the HSD call connection initiated by the BS is completed.

14. The method of claim 10 further comprising the steps of an MS originating rate re-negotiation during an HSD call by the following message exchange:

sending a Current Rate Modify Request signal message from the MS to the BS;
if the BS accepts the request, then:
sending a Current Rate Modify signal message to the MS from the BS; and
sending a Current Rate Modify Completion signal message from the MS to the BS;
if the rate change is not possible, then:
sending a Current Rate Modify Rejected signal message to the MS from the BS.

15. The method of claim 14 wherein, if the newly agreed data rates resulting from said exchange of Current Rate Modify messages require changes in the assigned Walsh channels, then further comprising the steps of using the Current Rate Modify and the Current Rate Modify Completion signal messages to facilitate the additional assignment or partial release of the Walsh codes with an exchange as follows:
sending a Current Rate Modify (new rate and code channels) signal message to the MS from the BS; and
sending a Current Rate Modify Completion signal message from the MS to the BS.

16. The method of claim 9 wherein said plurality of informational message fields comprise fields for:
ASYMMETRIC_RATES; FOR_RATE_SET; REV_RATE_SET; FOR_MUX_OPTION; REV_MUX_OPTION; SERVICE_TYPE; FOR_SUB_RATE_N; REV_SUB_RATE_N; FOR_PREF_MAX_RATE; REV_PREF_MAX_RATE; FOR_ACCEPT_MAX_RATE; REV_ACCEPT_MAX_RATE; FOR_CURRENT_RATE; REV_CURRENT_RATE; MOV_STATIONARY; and NUM_CON_REC.

17. The method of claim 16 wherein said NUM_CON_REC occurrences comprise the following record fields:
RECORD_LEN; CON_REF; SERVICE_OPTION; FOR_TRAFFIC; REV_TRAFFIC; SERVICE_QUALITY.

18. In a telecommunications system having a first and a second transceiving device communicating over a data channel with a first link for communications from the first transceiving device to the second transceiving device and a second link for communications from the second transceiving device to the first transceiving device, a method of configuring the data channel comprising the steps of:
determining, in the first transceiving device, a rate configuration for each of the first link and the second link for a selected communications application;
determining whether said rate configuration for the first link and the rate configuration for the second link determined in said step of determining a rate configuration are equal, and,
if it is determined that they are equal, then, transmitting a first message from the first transceiving device to the second transceiving device, said first message including a first rate configuration field indicating both said rate configuration for the first link and said rate configuration for the second link; and
if it is determined that they are not equal, then, transmitting a second message from the first transceiving device to the second transceiving device, said second message including a second rate configuration field indicating said rate configuration for the first link and a third rate configuration field indicating said rate configuration for the second link.

19. The method of claim 18, wherein said first and second messages each comprise a setup message requesting setup of the selected communications application between the first and second transceiving devices on the data channel.

20. The method of claim 18, wherein said first and second messages each comprise a status message indicating a current rate configuration for each of the first and second links to the second transceiving device.

* * * * *